United States Patent
Kato

(10) Patent No.: US 10,277,891 B2
(45) Date of Patent: Apr. 30, 2019

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Yuji Kato, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 96 days.

(21) Appl. No.: 15/439,567

(22) Filed: Feb. 22, 2017

(65) Prior Publication Data

US 2017/0257621 A1 Sep. 7, 2017

(30) Foreign Application Priority Data

Mar. 4, 2016 (JP) .................................. 2016-042494

(51) Int. Cl.
*H04N 13/344* (2018.01)
*H04N 13/366* (2018.01)

(52) U.S. Cl.
CPC ......... *H04N 13/344* (2018.05); *H04N 13/366* (2018.05)

(58) Field of Classification Search
CPC ........................... H04N 13/344; H04N 13/366
See application file for complete search history.

(56) References Cited

U.S. PATENT DOCUMENTS

2016/0086379 A1* 3/2016 Sadi ...................... G06T 19/006
345/633

FOREIGN PATENT DOCUMENTS

JP 2012-256274 A 12/2012

* cited by examiner

*Primary Examiner* — Mishawn N Hunter
(74) *Attorney, Agent, or Firm* — Canon USA, Inc., IP Division

(57) ABSTRACT

An image processing apparatus includes a first acquisition unit configured to acquire orientation information of a viewer, and an extraction unit configured to extract an overlapping region being a region in which relative positions from points intersecting with optical axes of lenses disposed in front of respective eyes of the viewer are equal, for a right eye display image and a left eye display image to be presented to the viewer. In addition, the image processing apparatus includes a generation unit configured to generate the display image from a predetermined reference image, based on the orientation information acquired by the first acquisition unit, and the overlapping region extracted by the extraction unit. In the overlapping region, the generation unit shares information about generation processing of the display image, between the right eye display image and the left eye display image.

9 Claims, 10 Drawing Sheets

IMAGE PROCESSING APPARATUS, IMAGE PROCESSING METHOD, AND STORAGE MEDIUM

BACKGROUND

Field of the Disclosure

The present disclosure generally relates to image processing and, more particularly, to an image processing apparatus, an image processing method, and a storage medium.

Description of the Related Art

There has been known a technique for displaying, in real time, a stereoscopic omnidirectional image on a stereoscopic image display device such as a head-mounted display (HMD), for enabling a viewer to view video with high realism. Nevertheless, there has not been established yet a technique for efficiently display a stereoscopic omnidirectional image in real time according to a direction that the viewer faces.

Japanese Patent Laid-Open No. 2012-256274 discloses an image generation method for efficiently displaying a non-stereoscopic omnidirectional image on a planar display. This method is a method of efficiently generating a planar image to be displayed on the display, by dividing in advance an omnidirectional image represented by a coordinate on a spherical surface, into a plurality of planes, and approximating projection conversion from a spherical surface to a plane, to projection conversion from a plane to a plane.

Nevertheless, when an image to be displayed on an HMD is generated, simple projection conversion from a plane to a plane is not sufficient, and in addition to the projection conversion, calculation that considers the distortion of an eyepiece lens is also preferably performed. Thus, the above-described method described in Japanese Patent Laid-Open No. 2012-256274 cannot be directly applied. In other words, the above-described technique described in Japanese Patent Laid-Open No. 2012-256274 cannot reduce calculation cost involved for the processing of generating a stereoscopic display image to be displayed on an HMD, from a stereoscopic omnidirectional image.

SUMMARY

Thus, one or more aspects of the present disclosure efficiently generate a display image to be displayed on a stereoscopic image display device.

According to an aspect of the present disclosure, an image processing apparatus includes a first acquisition unit configured to acquire orientation information indicating orientation of a viewer, an extraction unit configured to extract an overlapping region being a region in which relative positions from points intersecting with optical axes of lenses disposed in front of respective eyes of the viewer are equal, for a right eye display image and a left eye display image to be presented to the viewer, and a generation unit configured to generate the display image from a predetermined reference image, based on the orientation information acquired by the first acquisition unit, and the overlapping region extracted by the extraction unit. In the overlapping region, the generation unit shares information about generation processing of the display image, between the right eye display image and the left eye display image.

Further features of the present disclosure will become apparent from the following description of exemplary embodiments (with reference to the attached drawings).

DESCRIPTION OF THE EMBODIMENTS

Modes for carrying out one or more aspects of the present disclosure will be described in detail below with reference to the attached drawings. In addition, each of the exemplary embodiments to be described below is an example of an execution measure of the present disclosure, and is to be appropriately amended or modified according to the configuration and various conditions of a device to which the present disclosure is to be applied, and the present disclosure is not limited to the following exemplary embodiments.

In one or more aspects of the present disclosure, the description will be given of a method of efficiently generating a display image to be displayed on a stereoscopic image display device, while reducing a calculation amount, when displaying the display image on the stereoscopic image display device by converting a predetermined reference image. As the above-described reference image, an omnidirectional image obtained by imaging all directions such as a horizontal direction and a vertical direction, or an omnidirectional image obtained by imaging 360 degrees in the horizontal direction can be used. In one or more aspects of the present disclosure, the description will be given of a case in which a reference image is a stereoscopic omnidirectional image including a left eye omnidirectional image and a right eye omnidirectional image, and the stereoscopic image display device is a head-mounted display (HMD).

Figure 1:
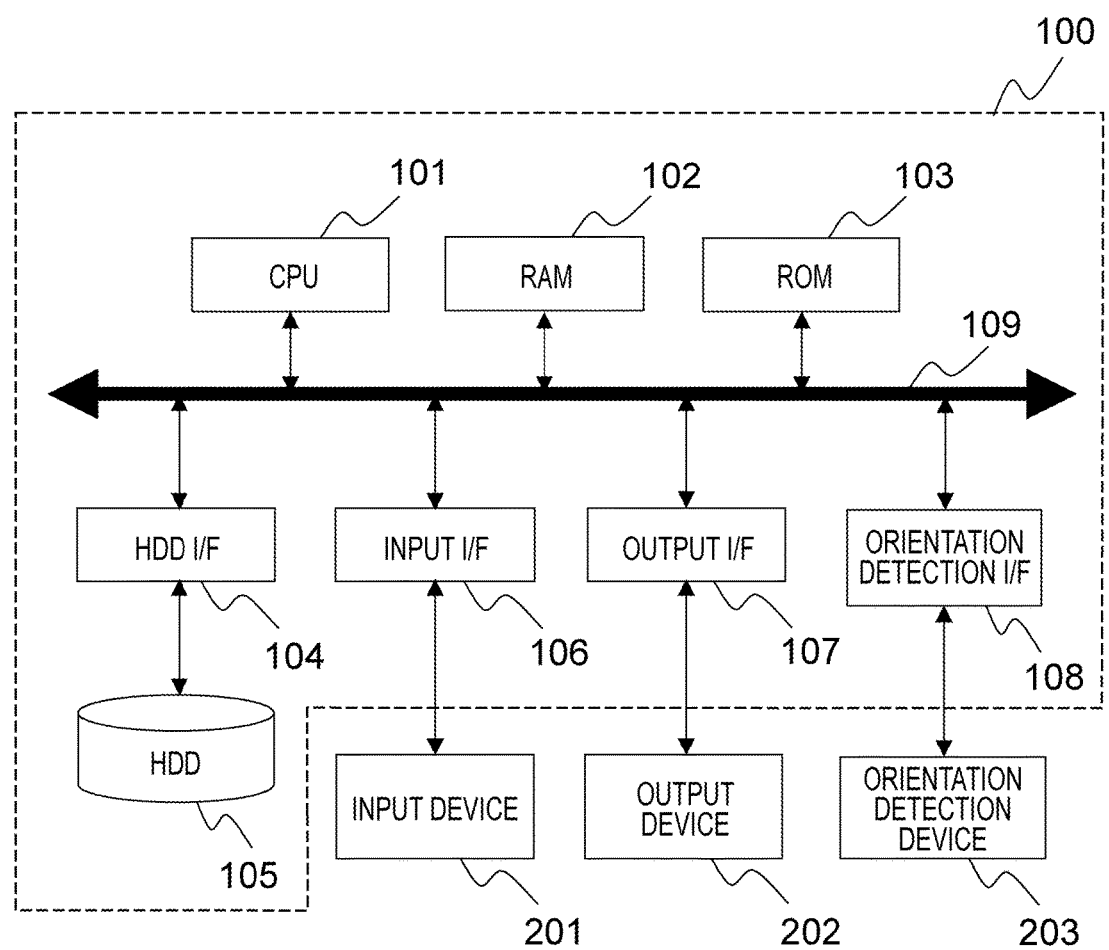
FIG. 1 is a hardware configuration diagram of an image processing apparatus according to one or more aspects of the present disclosure.

FIG. 1 is a hardware configuration diagram of an image processing apparatus 100 according to one or more aspects of the present disclosure. The image processing apparatus 100 includes a central processing unit (CPU) 101, a random access memory (RAM) 102, a read-only memory (ROM) 103, a hard disk drive (HDD) interface (I/F) 104, an HDD 105, an input I/F 106, an output I/F 107, an orientation detection I/F 108, and a system bus 109.

The CPU 101, which may include one or more processors and one or more memories, comprehensively controls an operation in the image processing apparatus 100, and controls the component parts (102 to 104, and 106 to 108) via the system bus 109. The RAM 102 functions as a work memory of the CPU 101. Programs and various types of data for the CPU 101 executing processing are stored in the ROM 103 and the HDD 105. In other words, the CPU 101 executes various functional operations by executing programs stored in the ROM 103 and the HDD 105 when executing processing.

The HDD I/F 104 is connected with the HDD 105 and a secondary storage device (not illustrated) such as an optical disk drive. The HDD I/F 104 is, for example, a Serial Advanced Technology Attachment (ATA) (SATA) or the like. The CPU 101 can read and write data from and into the HDD 105 via the HDD I/F 104. In addition, the CPU 101 can load data stored in the HDD 105, into the RAM 102, and save the data loaded in the RAM 102, into the HDD 105. Then, the CPU 101 can regard the data loaded in the RAM 102, as a program, and execute the program.

The input I/F 106 is connected with an input device 201 such as a keyboard, a mouse, a digital camera, and a scanner. The input I/F 106 can be formed by a serial bus interface such as, for example, a universal serial bus (USB) and the Institute of Electrical and Electronics Engineers (IEEE) 1394. The CPU 101 can read various types of data from the input device 201 via the input I/F 106. The output I/F 107 is connected with an output device 202 being a stereoscopic image display device such as a head-mounted display device that a viewer can mount on its head. The output I/F 107 can be formed by a video output interface such as, for example, a digital visual interface (DVI) and a high-definition multimedia interface (HDMI) (registered trademark).

In one or more aspects of the present disclosure, the description will be given of a case in which the output device 202 is an HMD. The HMD 202 includes eyepiece lenses and image display surfaces (panels) that are disposed in front of the eyes of a viewer. The eyepiece lenses and the panels are disposed in front of the eyes of the viewer so as to respectively correspond to the left and right eyes of the viewer. By displaying a left eye display image and a right eye display image that have been output from the image processing apparatus 100, on the respective panels, the HMD 202 can present the display images to the viewer. In other words, by transmitting data to the HMD 202 via the output I/F 107, the CPU 101 can perform display control of displaying an image on the HMD 202.

The orientation detection I/F 108 is connected with an orientation detection device 203 including an acceleration sensor, an angular velocity sensor, a geomagnetic sensor, and a global positioning system (GPS). The orientation detection I/F 108 can be formed by a serial bus interface such as, for example, a USB and the IEEE 1394. The orientation detection device 203 is attached to the image display surface or the like of the HMD 202, and the CPU 101 can read orientation information of the HMD 202 from the orientation detection device 203 via the orientation detection I/F 108. In other words, the CPU 101 can acquire, from the orientation detection device 203, orientation information (information about the orientation of the head) of the viewer mounting the HMD 202. In addition, the CPU 101 can also input orientation information via the input device 201 such as a mouse and a keyboard.

Figure 2:
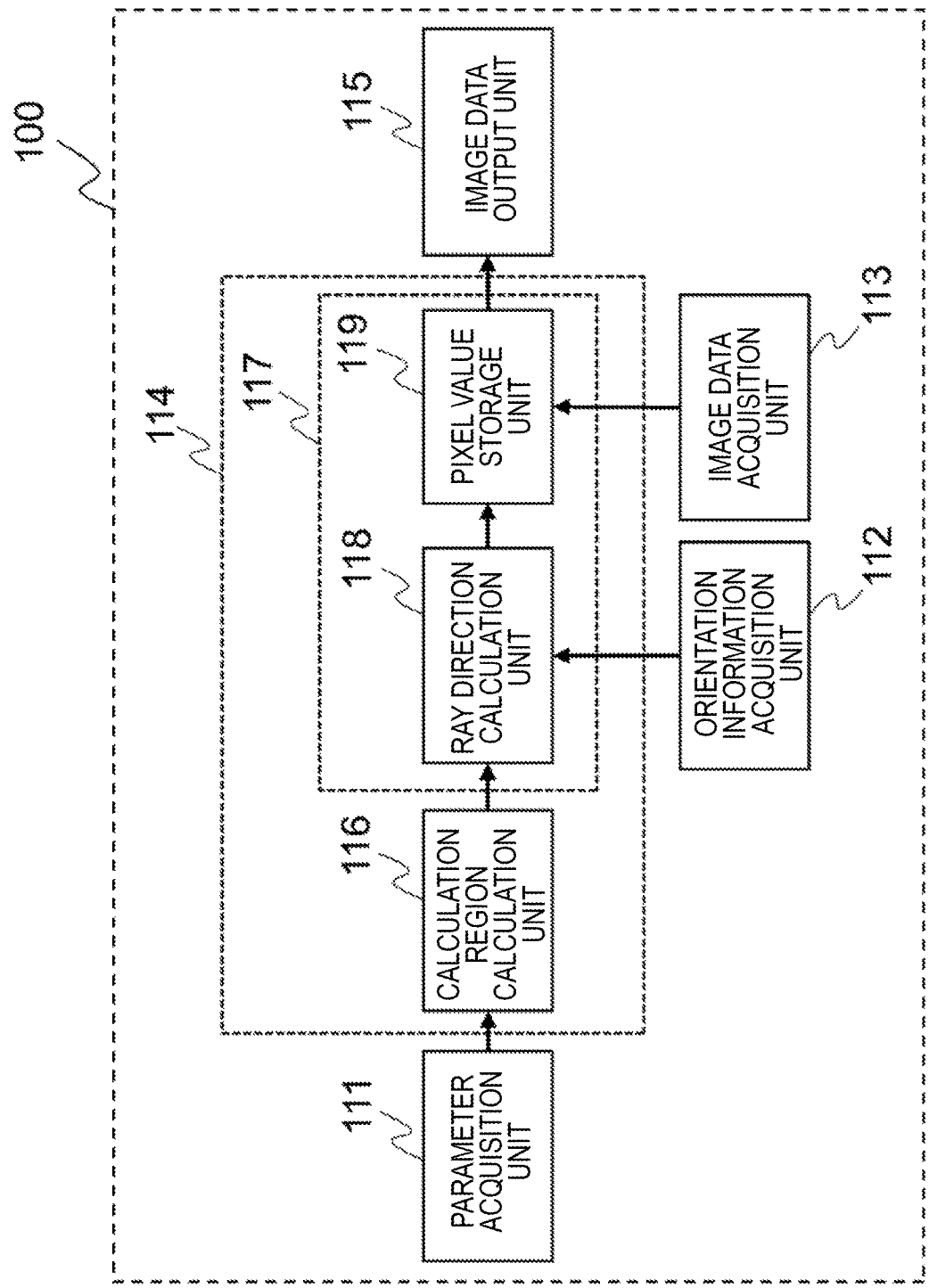
FIG. 2 is a functional block diagram of the image processing apparatus according to one or more aspects of the present disclosure.

FIG. 2 is a functional block diagram of the image processing apparatus 100. The image processing apparatus 100 includes a parameter acquisition unit 111, an orientation information acquisition unit 112, an image data acquisition unit 113, an image processing unit 114, and an image data output unit 115. The image processing unit 114 includes a calculation region calculation unit 116 and a pixel value acquisition unit 117. The pixel value acquisition unit 117 includes a ray direction calculation unit 118 and a pixel value storage unit 119.

The function of each unit of an image processing apparatus 100 illustrated in FIG. 2 can be implemented by the CPU 101 in FIG. 1 executing a program. In addition, at least part of the units of the image processing apparatus 100 illustrated in FIG. 2 may operate as dedicated hardware. In this case, dedicated hardware operates based on the control of the CPU 101.

The parameter acquisition unit 111 acquires, from the input device 201, display parameters for displaying a stereoscopic omnidirectional image on the HMD 202. In addition, the parameter acquisition unit 111 may acquire display parameters once saved into the RAM 102 or the HDD 105. Here, the display parameter include focal lengths of the eyepiece lenses constituting the HMD 202, a distortion parameter, center positions of the eyepiece lenses on the panels, panel resolution, a panel size, and the like.

The orientation information acquisition unit 112 acquires orientation information from the orientation detection device 203 or the input device 201. In addition, the orientation information acquisition unit 112 may acquire orientation information once saved into the RAM 102 or the HDD 105. The image data acquisition unit 113 acquires a stereoscopic omnidirectional image from the HDD 105 or the input device 201. The image processing unit 114 generates a display image to be displayed on the HMD 202, based on the display parameters, the orientation information, and the stereoscopic omnidirectional image. The image data output unit 115 outputs the display image generated by the image processing unit 114, to the HMD 202.

The image processing unit 114 generates a left eye display image and a right eye display image to be displayed on the HMD 202. In one or more aspects of the present disclosure, the image processing unit 114 extracts a region in which the same calculation is to be performed in the generation processing of the display images, for the left eye display image and the right eye display image. Then, the image processing unit 114 reduces the entire calculation amount by suppressing the number of the above-described calculations to one by sharing a calculation result (information about the generation processing of the display images), between the left eye display image and the right eye display image, in the extracted region.

The calculation region calculation unit 116 of the image processing unit 114 calculates a region (calculation region) for calculation in the display image generation processing, and the pixel value acquisition unit 117 samples a pixel value corresponding to each pixel position in the calculation region, from a predetermined reference image. The ray direction calculation unit 118 of the pixel value acquisition unit 117 calculates information indicating a direction of a ray to be displayed at each pixel position in the calculation region, as correspondence information for associating a pixel position in the display image with a pixel position in the predetermined reference image.

The above-described reference image is a stereoscopic omnidirectional image. The stereoscopic omnidirectional image is image data in which colors of rays of all directions are saved. Thus, the pixel value storage unit 119 can sample a pixel value corresponding to each pixel position in the calculation region, from the stereoscopic omnidirectional image, based on the calculated ray direction. The pixel value storage unit 119 stores the sampled pixel value into a corresponding pixel position in the display image.

Figure 3:
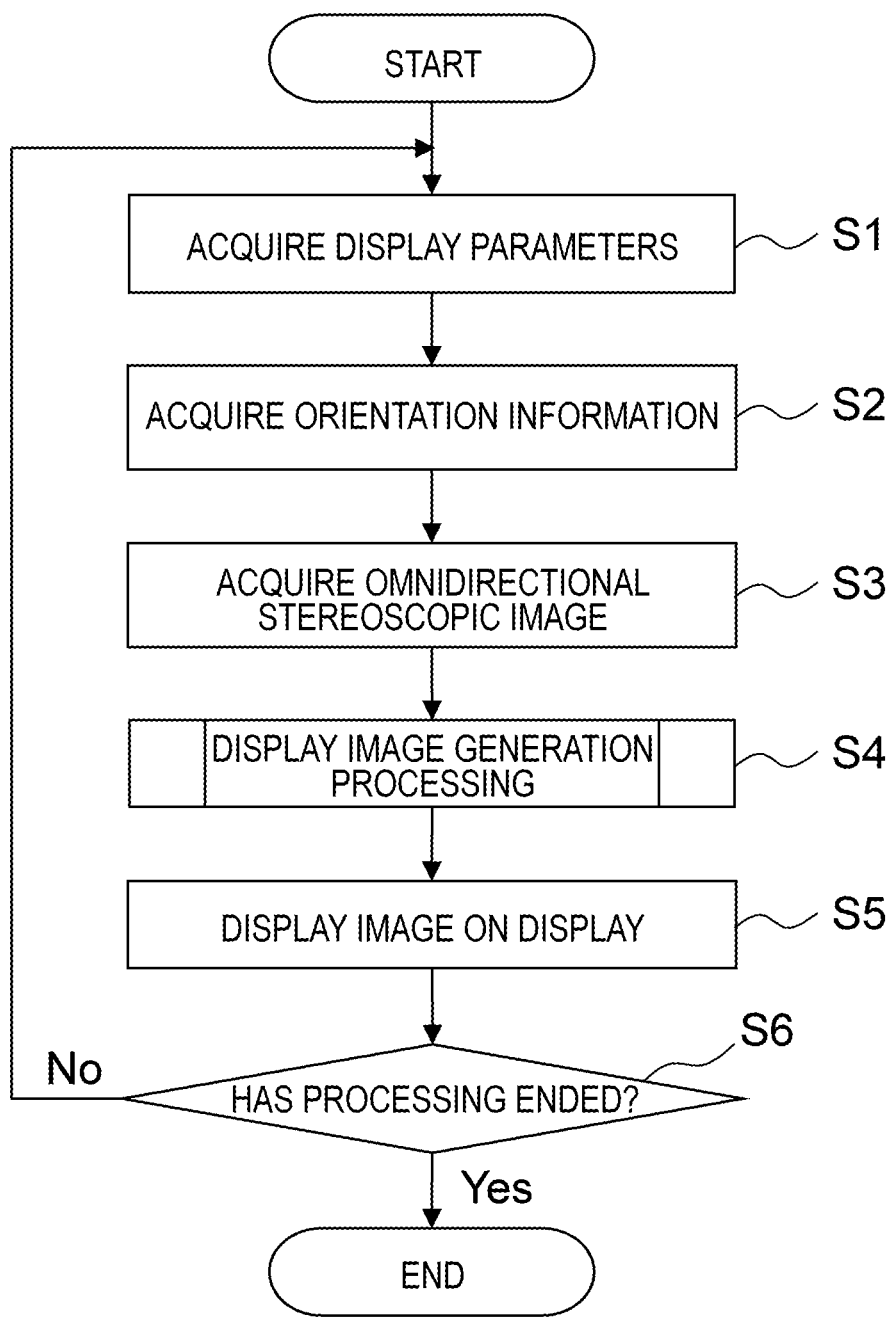
FIG. 3 is a flowchart illustrating an operation of the image processing apparatus according to one or more aspects of the present disclosure.

FIG. 3 is a flowchart illustrating an operation of the image processing apparatus 100. The image processing apparatus 100 can execute each process illustrated in FIG. 3, by the CPU 101 reading and executing a program. Hereinafter, an alphabet "S" means a step in the flowchart.

First, in S1, the parameter acquisition unit 111 acquires display parameters, and the processing proceeds to S2. In S2, the orientation information acquisition unit 112 acquires orientation information, and the processing proceeds to S3. Here, the orientation information refers to data indicating the orientation of the HMD 202, and is assumed to be a 3×3 rotation matrix M in one or more aspects of the present disclosure. In addition, the orientation information may be represented using a quaternion, or the expression of roll, pitch, and yaw.

Figure 4A:
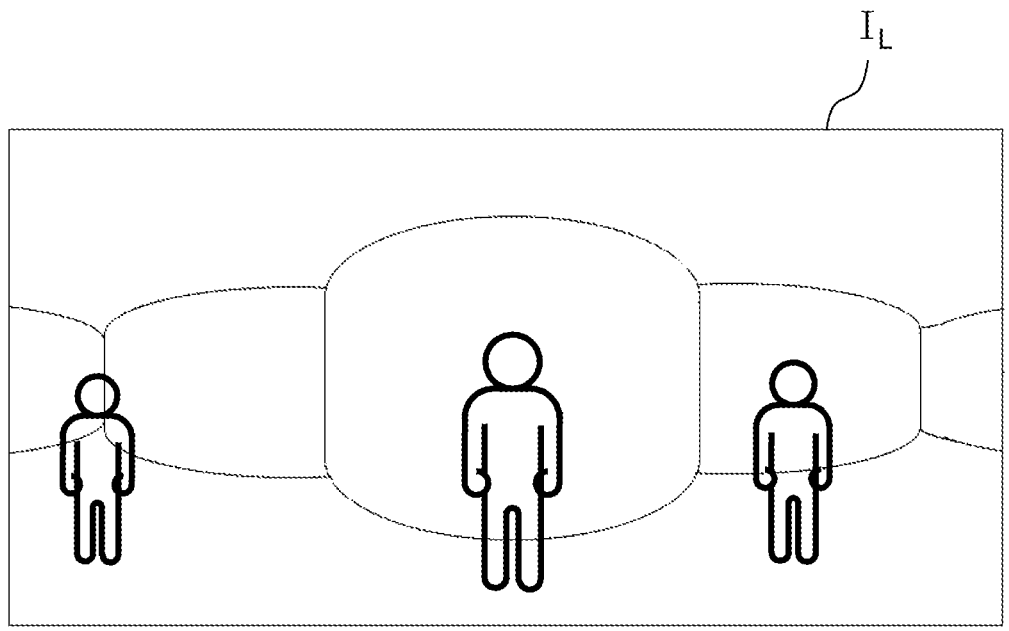
FIGS. 4A and 4B illustrate examples of omnidirectional images according to one or more aspects of the present disclosure.
Figure 4B:
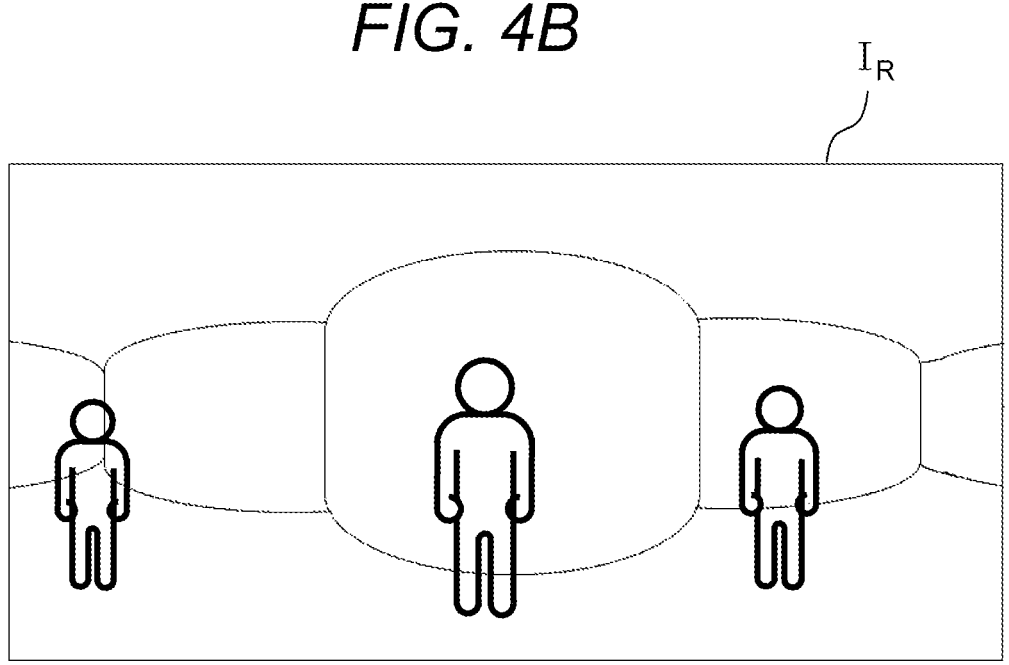

In S3, the image data acquisition unit 113 acquires a stereoscopic omnidirectional image to be displayed next. Examples of stereoscopic omnidirectional images are illustrated in FIGS. 4A and 4B. In one or more aspects of the present disclosure, among the omnidirectional images, an image to be displayed for the left eye will be referred to as a left eye omnidirectional image $I_L$, and an image to be displayed for the right eye will be referred to as a right eye omnidirectional image $I_R$. Here, as described above, the omnidirectional image is image data in which colors of rays of all directions are saved. The horizontal axis of the omnidirectional image is an azimuthal angle, and the range thereof is $[0, 2\pi]$. In addition, the vertical axis of the omnidirectional image is an elevation angle, and the range thereof is $[-\pi/2, \pi/2]$.

Figure 5A:
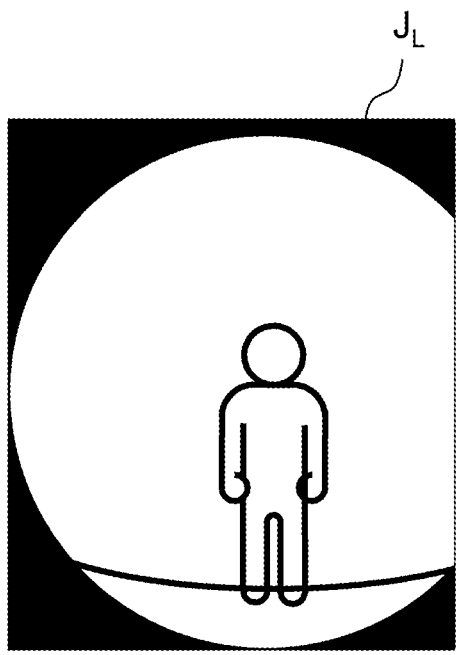
FIGS. 5A and 5B illustrate examples of display images according to one or more aspects of the present disclosure.
Figure 5B:
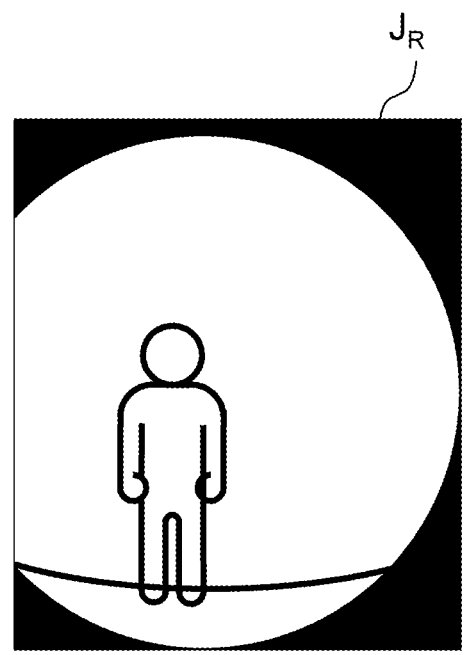

In S4, the image processing unit 114 generates a display image to be displayed on the output device 202, based on the display parameters acquired in S1, the orientation information acquired in S2, and the omnidirectional images $I_L$ and $I_R$ acquired in S3. The examples of the display images are illustrated in FIGS. 5A and 5B. In one or more aspects of the present disclosure, among the display image, an image for presenting to the left eye will be referred to as a left eye display image $J_L$, and an image for presenting to the right eye will be referred to as a right eye display image $J_R$. The display images are images corrected according to the distortion of the eyepiece lenses, so as to appear without distortion when being viewed through the eyepiece lenses. The details of the display image generation processing executed in S4 will be described later.

In S5, the image data output unit 115 performs display control of displaying the display images $J_L$ and $J_R$ that have been generated from the stereoscopic omnidirectional image, on the HMD 202, by outputting the display images $J_L$ and $J_R$ that have been generated in S4, to the HMD 202. In S6, the parameter acquisition unit 111 determines whether to end the image processing. If the parameter acquisition unit 111 determines to continue the processing, the processing returns to S1, and if the parameter acquisition unit 111 determines to end the processing, the processing in FIG. 3 ends.

Hereinafter, the display image generation processing executed by the image processing unit 114 will be described in detail.

The image processing unit 114 generates an image to be displayed on the HMD 202, by sampling pixel values from the stereoscopic omnidirectional image according to the direction that the head of the viewer faces. For sampling pixel values from the stereoscopic omnidirectional image, the image processing unit 114 calculates a direction of a ray to be displayed at each pixel position on the panel of the HMD 202, based on the orientation information of the viewer (orientation information of the HMD 202). The ray direction can be represented by an azimuthal angle θ indicating an angle in the horizontal direction, and an elevation angle φ indicating an angle in the vertical direction. In addition, the ray direction (θ, φ) is determined by a relative position from an intersection point of an optical axis of the eyepiece lens, and the display image.

Figure 7A:
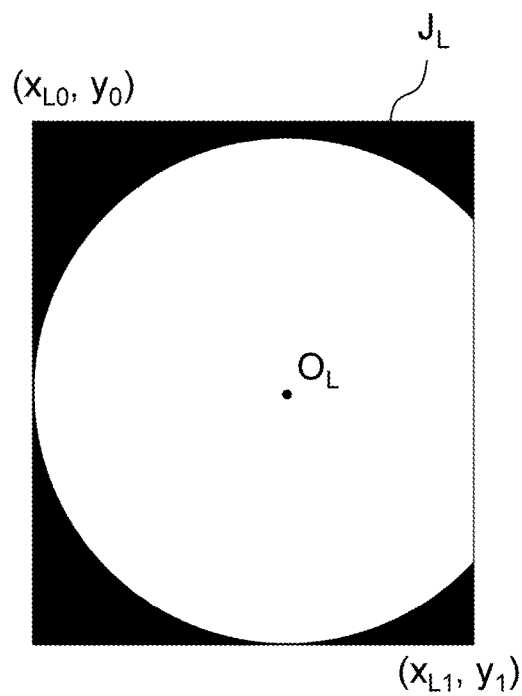
FIGS. 7A and 7B are diagrams each illustrating a coordinate system on a display image according to one or more aspects of the present disclosure.
Figure 7B:
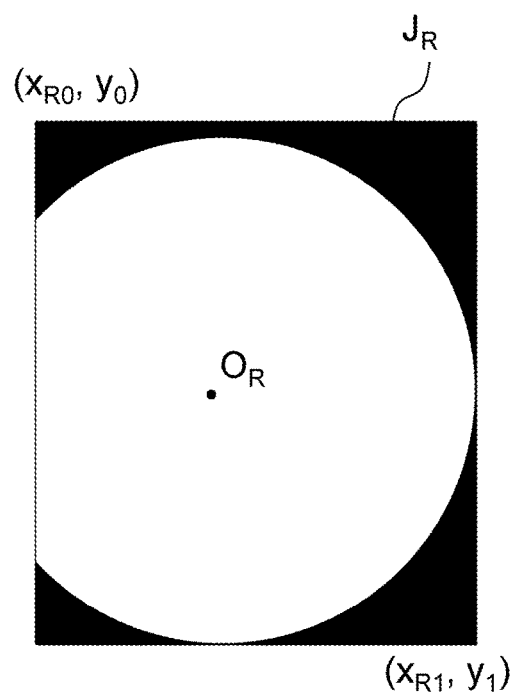

As illustrated in FIGS. 7A and 7B, an intersection point with an optical axis of the eyepiece lens on the left eye display image $J_L$ is denoted by $O_L$, an intersection point with an optical axis of the eyepiece lens on the right eye display image $J_R$ is denoted by $O_R$, and pixel positions in the left and right images in coordinate systems having origins at these points are denoted by $(x_L, y_L)$ and $(x_R, y_R)$, respectively. Here, in the left eye display image $J_L$, an upper left coordinate is denoted by $(x_{L0}, y_0)$, and a lower right coordinate is denoted by $(x_{L1}, y_1)$. Similarly, in the right eye display image $J_R$, an upper left coordinate is denoted by $(x_{R0}, y_0)$, and a lower right coordinate is denoted by $(x_{R1}, y_1)$. Pixels having the same relative position from the lens center have the same direction of an incident ray. Thus, if $(x_L, y_L)$ and $(x_R, y_R)$ have the same coordinate values, a ray direction (θ, φ) to be displayed at the pixel position also becomes the same.

Thus, in one or more aspects of the present disclosure, the image processing unit 114 does not derive a direction of a ray to be displayed, for each of the pixel positions $(x_L, y_L)$ and $(x_R, y_R)$ having the same coordinate values, but shares a derivation result of the ray direction. In other words, the image processing unit 114 reduces the entire calculation cost by utilizing the fact that the directions of incident rays can be obtained by one calculation, as for a region in which relative positions from points on the left and right display images that intersect with optical axes of eyepiece lenses are equal.

Figure 6:
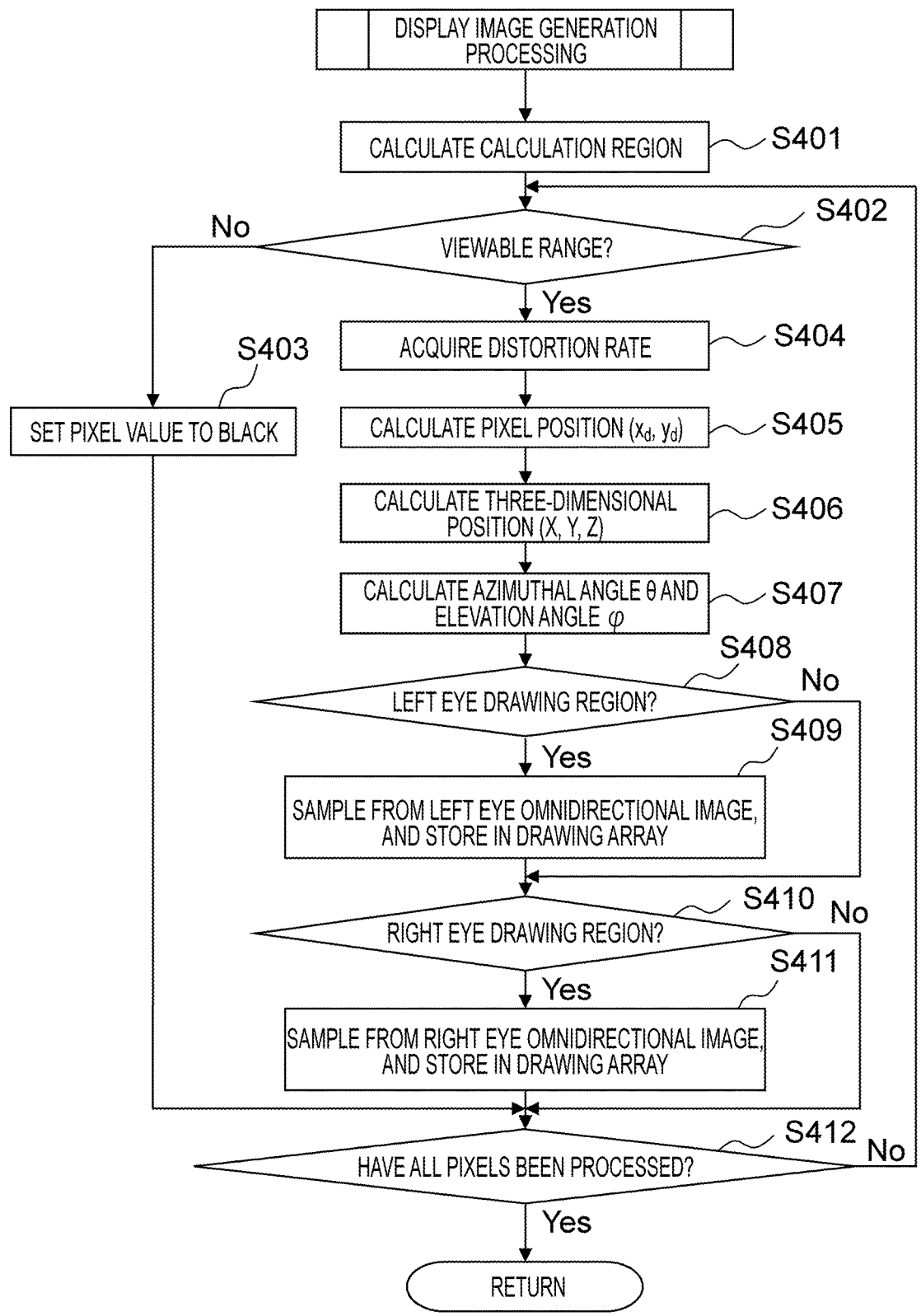
FIG. 6 is a flowchart illustrating display image generation processing according to one or more aspects of the present disclosure.

FIG. 6 is a flowchart illustrating the display image generation processing executed in S4 of FIG. 3. In the display image generation processing, the image processing unit 114 samples pixel values from the stereoscopic omnidirectional image, for all the pixel positions in the above-described calculation region. The image processing unit 114 stores the sampled pixel values into corresponding pixel positions in both or either one of the left eye display image and the right eye display image according to the pixel positions. The image processing unit 114 generates display images in this manner. In the following processing, the image processing unit 114 calculates a ray direction (θ, φ) using a pixel position (x, y) in a coordinate system having an origin at the lens center, and obtains a pixel value in the display image from the direction.

Figure 8A:
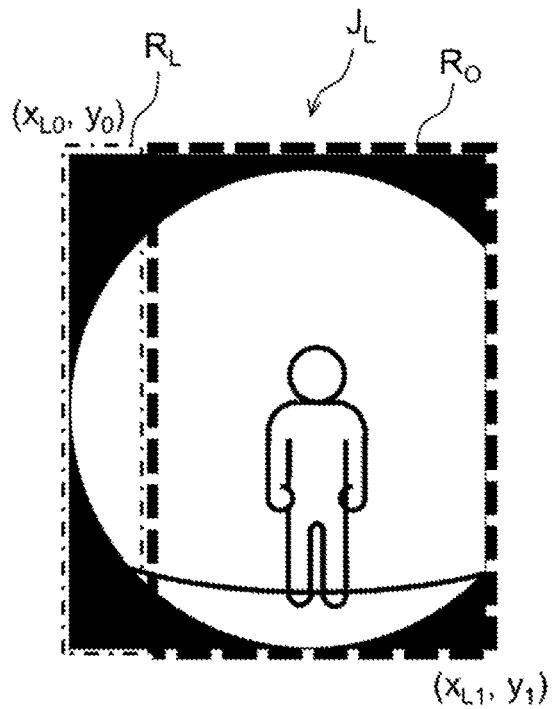
FIGS. 8A to 8C are diagrams each illustrating a calculation region according to one or more aspects of the present disclosure.
Figure 8B:
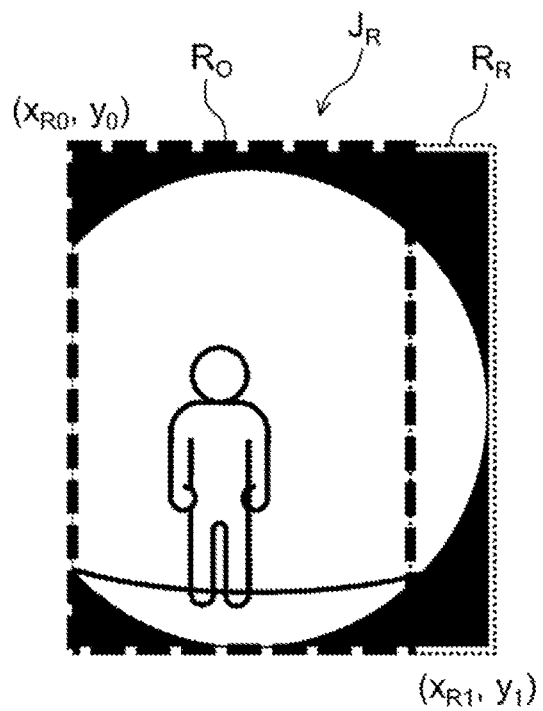

First, in S401, the calculation region calculation unit 116 calculates a calculation region R being a region for calculation in the display image generation. As illustrated in FIG. 8A, in the left eye display image $J_L$, a region $R_O$ in which pixels having the same coordinate values as those of pixels in the right eye display image $J_R$ are arranged, and a region $R_L$ in which pixels having different coordinate values from those of pixels in the right eye display image $J_R$ are arranged exist. Similarly, as illustrated in FIG. 8B, in the right eye display image $J_R$, a region $R_O$ in which pixels having the same coordinate values as those of pixels in the left eye display image $J_L$ are arranged, and a region $R_R$ in which pixels having different coordinate values from those of pixels in the left eye display image $J_L$ are arranged exist.

Figure 8C:
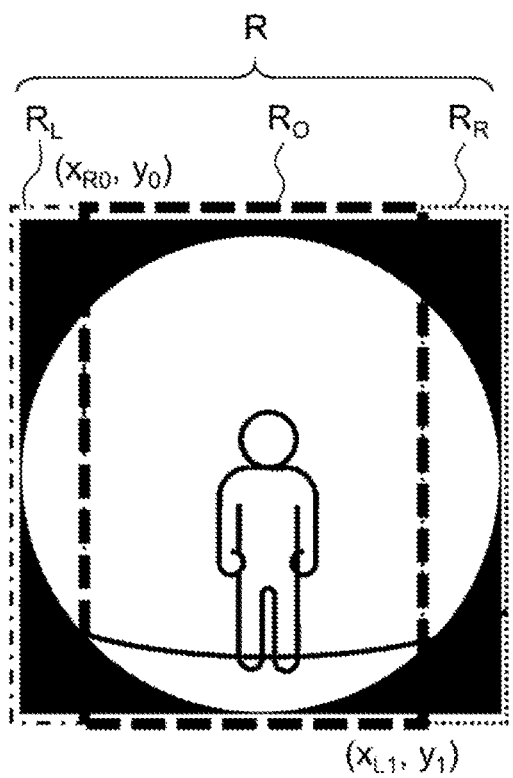

As illustrated in FIG. 8C, the calculation region R includes the region $R_O$, the region $R_L$, and the region $R_R$. The region $R_O$ is a region in which relative positions from points on the images that intersect with optical axes of the eyepiece lenses are equal, and is a region in which the same calculation can be performed in the left and right images (region in which calculation can be omitted). Hereinafter, the region $R_O$ will be referred to as an overlapping region. In addition, the region $R_L$ is a region for calculation only for the left eye display image $J_L$, and the region $R_R$ is a region for calculation only for the right eye display image $J_R$. The overlapping region $R_O$ in which the same calculation can be performed in the left and right images is a region existing in both of the left eye display image $J_L$ and the right eye display image $J_R$, and is a quadrangular region having the upper left coordinate values $(x_{R0}, y_0)$ and the lower right coordinate values $(x_{L1}, y_1)$. The region $R_L$ in which calculation is performed only in the left eye display image $J_L$ is a region on the left eye display image $J_L$ that excludes the overlapping region $R_O$, and is a quadrangular region having the upper left coordinate values $(x_{L0}, y_0)$ and the lower right coordinate values $(x_{R0}, y_1)$. The region $R_R$ in which calculation is performed only in the right eye display image $J_R$ is a region on the right eye display image $J_R$ that excludes the overlapping region $R_O$, and is a quadrangular region having the upper left coordinate values $(x_{L1}, y_0)$ and the lower right coordinate values $(x_{R1}, y_1)$.

The calculation region R is a region obtained by combining these 3 regions $R_O$, $R_L$, and $R_R$, and is a quadrangular region having the upper left coordinate values $(x_{L0}, y_0)$ and the lower right coordinate values $(x_{R1}, y_1)$. Based on the display parameters, the calculation region calculation unit 116 calculates the calculation region R, as a region in which a ray direction is calculated.

Next, in step S402, the ray direction calculation unit 118 determines whether a position (x, y) of a target pixel in the calculation region R falls within a viewable range. Specifically, the ray direction calculation unit 118 determines whether the pixel position (x, y) falls within the viewable range, based on a distance r from the lens center. The pixel position (x, y) has an origin at the lens center. Thus, the distance r from the lens center is $(x^2+y^2)^{1/2}$. When the viewable range on the image display surface of the HMD 202 is a circle with a radius A, if r≤A is satisfied, the pixel position (x, y) falls within the viewable range.

Thus, if r>A is satisfied, the ray direction calculation unit 118 determines that the pixel position (x, y) falls outside the viewable range and drawing needs not to be performed, and the processing proceeds to S403, in which a pixel value in the display image that corresponds to the pixel position (x, y) is set to black. Then, the processing proceeds to S412. On the other hands, if r≤A is satisfied, because the pixel position (x, y) falls within the viewable range, the ray direction calculation unit 118 determines to advance drawing processing, and the processing proceeds to S404.

Figure 9:
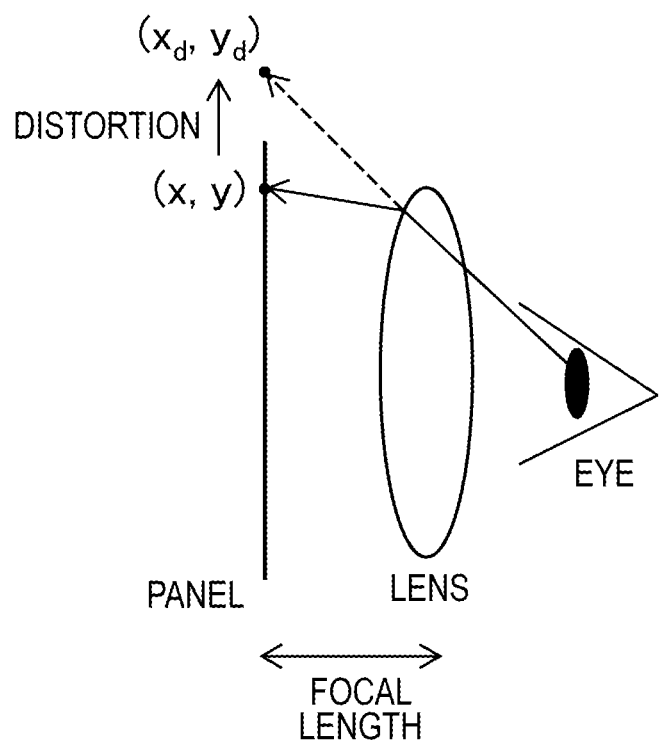
FIG. 9 is a diagram illustrating distortion of a lens on a display image according to one or more aspects of the present disclosure.

In S404, the ray direction calculation unit 118 acquires the rate of distortion caused by the lens at the pixel position (x, y), as distortion information of the eyepiece lens. FIG. 9 illustrates an example of distortion on an image coordinate. The distortion rate is determined by a distance r from the lens center, and optical characteristics of the lens. In one or more aspects of the present disclosure, the ray direction calculation unit 118 acquires a distortion rate using a look-up table of distortion rates with respect to distances r from the lens center that is prepared in advance according to the lens being used.

In addition, if a distortion rate varies for each wavelength, depending on the characteristics of the eyepiece lens, a look-up table is prepared for each wavelength of R, G, and B on the panel. Then, in steps performed subsequent to the acquisition of a distortion rate of each of R, G, and B, the processing is performed using a distortion rate different for each color of R, G, and B.

In S405, the ray direction calculation unit 118 calculates a pixel position $(x_d, y_d)$ at which the pixel position (x, y) actually appears due to the distortion of the lens. The pixel position $(x_d, y_d)$ can be calculated by multiplying the coordinate values of the pixel position (x, y) by a distortion rate d:

$$x_d = x \times d,$$
$$y_d = y \times d \qquad (1).$$

Figure 10:
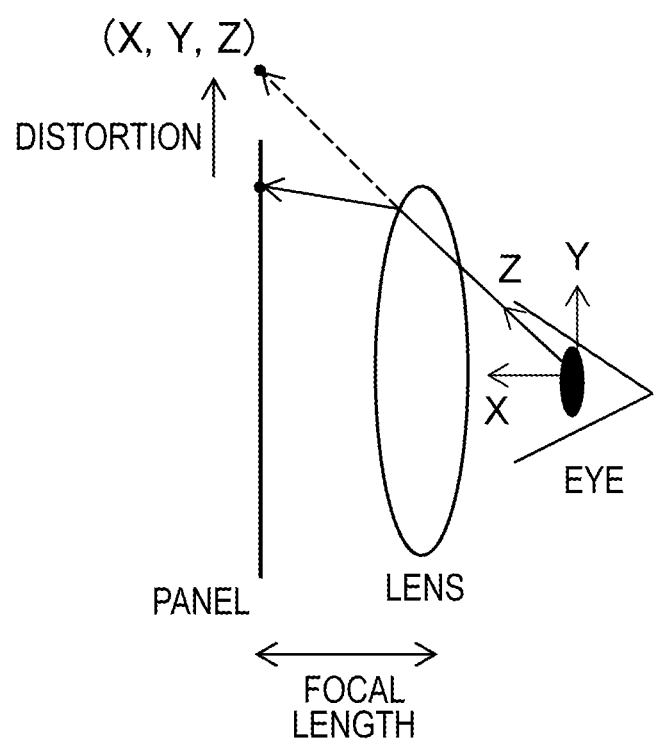
FIG. 10 is a diagram illustrating a pixel position in a coordinate system having an origin at an eye position according to one or more aspects of the present disclosure.

In S406, the ray direction calculation unit 118 converts the distorted pixel position $(x_d, y_d)$ into a three-dimensional position (X, Y, Z) in a coordinate system having an origin at the position of the eye. FIG. 10 illustrates an example of relationship between a point on an image coordinate and a point on a three-dimensional coordinate. If the orientation information is assumed to be the 3×3 rotation matrix M, and a focal length represented for each pixel is denoted by f, (X, Y, Z) can be calculated by the following formula:

$$[XYZ]^t = M \times [x_d y_d f]^t \qquad (2).$$

In S407, the ray direction calculation unit 118 calculates an azimuthal angle θ and an elevation angle φ that represent a ray direction, based on the three-dimensional position (X, Y, Z) of the pixel. When a distance from the origin to the three-dimensional position (X, Y, Z) is represented by $L = (X^2+Y^2+Z^2)^{1/2}$, the azimuthal angle θ and the elevation angle φ can be calculated by the following formula:

$$\varphi = \arcsin(Y/L),$$
$$\theta = \arcsin(Z/L/\cos \varphi) \qquad (3).$$

In other words, the ray direction (θ, φ) can be derived based on the distortion information of the lens, and the orientation information of the viewer.

In S408, the pixel value storage unit 119 determines whether a target pixel is a pixel to be drawn in a left eye region of the display image. Specifically, if the target pixel is included in the region $R_L$ or the region $R_O$, the pixel value storage unit 119 determines that the target pixel is a pixel to be drawn in the left eye region, and the processing proceeds to S409. If the target pixel is included in the region $R_R$, the processing proceeds to S410.

In S409, the pixel value storage unit 119 acquires a pixel value of a pixel corresponding to the ray direction (θ, φ) calculated in S407, from the left eye omnidirectional image $I_L$, and stores the acquired pixel value into the left eye display image $J_L$. The position into which the pixel value is stored is a position moved from the origin $O_L$ in the left eye display image $J_L$, by (x, y). In addition, when a pixel value is sampled from an omnidirectional image, the nearest neighbor pixel value may be acquired, or sampling may be performed by performing interpolation using surrounding pixel values, such as bilinear interpolation and bicubic interpolation.

In S410, the pixel value storage unit 119 determines whether a target pixel is a pixel to be drawn in a right eye region of the display image. Specifically, if the target pixel is included in the region $R_R$ or the region $R_O$, the pixel value storage unit 119 determines that the target pixel is a pixel to be drawn in the right eye region, and the processing proceeds to S411. If the target pixel is included in the region $R_L$, the processing proceeds to S412. In S411, the pixel value storage unit 119 acquires a pixel value of a pixel corresponding to the ray direction (θ, φ) calculated in S407, from the right eye omnidirectional image $I_R$, and stores the acquired pixel value into the right eye display image $J_R$. The position into which the pixel value is stored is a position moved from the origin $O_R$ in the right eye display image $J_R$, by (x, y). In addition, sampling is performed similarly to that in S409.

In this manner, as for the overlapping region $R_O$, the pixel value storage unit 119 samples pixel values from both of the left and right omnidirectional images, based on the ray direction (θ, φ) calculated in S407, and stores the values into both of the left and right display images. On the other hands, as for the region $R_L$, the pixel value storage unit 119 samples pixel values from the left eye omnidirectional image, and stores the values into the left eye display image. In addition, as for the region $R_R$, the pixel value storage unit 119 samples pixel values from the right eye omnidirectional image, and stores the values into the right eye display image.

Next, in S412, the ray direction calculation unit 118 determines whether the processing has been completed for all the pixels in the calculation region R. Then, if the ray direction calculation unit 118 determines that the processing of all the pixels has not been completed, the processing returns to S402. If the ray direction calculation unit 118 determines that the processing of all the pixels has been completed, the display image generation processing in FIG. 6 ends.

As described above, the image processing apparatus 100 extracts an overlapping region being a region in which relative positions from points intersecting with optical axes of the lenses disposed in front of the respective eyes of the viewer are equal, for the right eye display image and the left eye display image to be presented to the viewer. In addition, the image processing apparatus 100 generates a display image from a predetermined reference image, based on the orientation information of the viewer and the above-described overlapping region. At this time, in the overlapping region, the image processing apparatus 100 shares information about the generation processing of the display image, between the right eye display image and the left eye display image. Here, the reference image is a stereoscopic omnidirectional image including a right eye omnidirectional image and a left eye omnidirectional image.

In this manner, the image processing apparatus 100 can calculate a region in which the same calculation is performed when the right eye display image and the left eye display image are generated, and share a calculation result of the region. This can reduce a calculation amount for the processing of generating a stereoscopic display image according to the orientation of the viewer, from a stereoscopic omnidirectional image.

Specifically, when generating a display image, the image processing apparatus 100 derives correspondence information for associating a pixel position in the display image with a pixel position in the reference image, based on the orientation information of the viewer, and the information of the overlapping region. Then, the image processing apparatus 100 generates the display image from the reference image based on the derived correspondence information and the information of the overlapping region. Thus, the image processing apparatus 100 can appropriately generate a display image based on the correspondence information. In addition, at this time, in the overlapping region, the image processing apparatus 100 shares a derivation result of the correspondence information between the right eye display image and the left eye display image. This can reduce the calculation cost of the pixel position in the reference image that corresponds to the pixel position in the display image.

Furthermore, the image processing apparatus 100 derives, as the correspondence information, information indicating the direction of a ray to be displayed at each pixel position in the display image, and shares the correspondence information in the overlapping region. In this manner, the image processing apparatus 100 obtains the direction of a ray to be displayed at each pixel position in the overlapping region, by one calculation, by utilizing the fact that a color of the same ray is to be displayed in pixels having the same relative position from points in the left and right display images that intersect with optical axes of the lenses. In other words, the image processing apparatus 100 suppresses the number of calculations to one, without performing calculation twice for the left eye and the right eye, for calculating a pixel position in the reference image that corresponds to a pixel position in the overlapping region. Thus, if a point on the display image that intersects with an optical axis of the lens is positioned at the center of the display image, that is, if the number of inside pixels and the number of outside pixels are the same when viewed from the lens center, a calculation amount can be made ½.

In addition, when generating a display image, the image processing apparatus 100 samples a pixel value from the reference image based on the correspondence information, and stores the sampled pixel value into a corresponding pixel position in the display image. In this manner, the image processing apparatus 100 calculates, for each pixel in the left eye display image and the right eye display image, a corresponding pixel position in the omnidirectional image, and arranges the color of the pixel position by referring to the omnidirectional image, thereby generating the left and right display images. At this time, in the overlapping region, the image processing apparatus 100 shares the correspondence information between the left and right display images. Thus, as for the overlapping region, sampling of pixel values of both of the left and right display images can be performed from a single piece of correspondence information, so that the left and right display images can be efficiently generated.

Furthermore, the image processing apparatus 100 acquires the distortion information of the eyepiece lens, and derives the correspondence information based on the orientation information of the viewer, the information of the overlapping region, and the distortion information. In this manner, the image processing apparatus 100 generates the display images to be displayed on an HMD, considering the distortion information of the eyepiece lens as well. Thus, if the processing of calculating a region in which a calculation result can be shared between the left and right images, and sharing the calculation result as in one or more aspects of the present disclosure is not performed, a calculation amount increases, and it becomes difficult to display a stereoscopic omnidirectional image in real time on an HMD according to the orientation of the viewer.

In contrast to this, in one or more aspects of the present disclosure, a display image to be displayed on an HMD can be efficiently generated from a stereoscopic omnidirectional image according to the direction that the viewer faces. Thus, a stereoscopic omnidirectional image can be displayed in real time on an HMD, and the viewer can view video with high realism.

Other Exemplary Embodiments

The present disclosure can also be implemented by the processing of supplying a program for executing one or more functions of one or more of the above-described exemplary embodiments, to a system or an apparatus via a network or a storage medium, and one or more processors in a computer of the system or the apparatus reading and executing the program. In addition, the present disclosure can also be implemented by a circuit for executing one or more functions (for example, application specific integrated circuits (ASIC)).

According to one or more aspects of the present disclosure, a display image to be displayed on a stereoscopic image display device can be efficiently generated.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more aspects of the above-described embodiment(s) and/or that includes one or more circuits (e.g., application specific integrated circuit (ASIC)) for performing the functions of one or more aspects of the above-described embodiment(s), and by a method performed by the computer of the system or apparatus by, for example, reading out and executing the computer executable instructions from the storage medium to perform the functions of one or more aspects of the above-described embodiment(s) and/or controlling the one or more circuits to perform the functions of one or more aspects of the above-described embodiment(s). The computer may comprise one or more processors and one or more memories (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2016-042494, filed Mar. 4, 2016, which is hereby incorporated by reference herein in its entirety.

What is claimed is:

1. An image processing apparatus for generating a right eye display image and a left eye display image that are presented to a viewer according to orientation of the viewer, the apparatus comprising:
   one or more processors and one or more memories,
   the one or more memories being coupled to the one or more processors and having stored thereon instructions executable by the one or more processors, wherein the execution of the instructions causes the image processing apparatus to function as:
   a first acquisition unit configured to acquire orientation information about orientation of the viewer;
   an extraction unit configured to extract an overlapping region in which relative positions from points intersecting with optical axes of lenses disposed in front of respective eyes of the viewer are equal, for the right eye display image and the left eye display image to be presented to the viewer;
   a derivation unit configured to derive a ray direction to be displayed at each pixel position for the right eye display image and the left eye display image based on the orientation information acquired by the first acquisition unit; and
   a generation unit configured to generate the right eye display image and the left eye display image from a predetermined reference image in which color for each ray direction is stored, based on the ray direction for each pixel position derived by the derivation unit,
   wherein the derivation unit performs calculations to derive the ray direction to be displayed at each pixel position according to the overlapping region, wherein the number of the calculations is less than a sum of the number of the pixels of the right eye display image and the number of the pixels of the left eye display image.

2. The image processing apparatus according to claim 1, wherein, in the overlapping region, the derivation unit shares a derivation result of the ray direction between the right eye display image and the left eye display image.

3. The image processing apparatus according to claim 1, wherein the generation unit generates the display image by sampling a pixel value from the reference image based on the ray direction derived by the derivation unit, and storing the sampled pixel value into a corresponding pixel position in the display image.

4. The image processing apparatus according to claim 1, further comprising a second acquisition unit configured to acquire distortion information of the lens,
   wherein the derivation unit derives the ray direction based on the orientation information acquired by the first acquisition unit, the overlapping region extracted by the extraction unit, and the distortion information acquired by the second acquisition unit.

5. The image processing apparatus according to claim 1, wherein the reference image is a stereoscopic omnidirectional image including a right eye omnidirectional image and a left eye omnidirectional image.

6. The image processing apparatus according to claim 1, further comprising a display control unit configured to display the display image generated by the generation unit, on a head-mounted display device that the viewer can mount.

7. The image processing apparatus according to claim 1:
   wherein the extraction unit extracts a calculation region that includes the overlapping region as a region where the ray direction is to be derived for the right eye display image and the left eye display image that are presented to the viewer,
   wherein the derivation unit calculates ray information for each pixel position in the calculation region, and
   wherein the generation unit determines whether or not the ray information of target of processing derived by the derivation unit is necessary for generating the right eye display image and for generating the left eye display image, and generates the right eye display image and the left eye display image by performing sampling from the predetermined reference image on a basis of a determination result.

8. An image processing method for generating a right eye display image and a left eye display image that are presented to a viewer according to orientation of the viewer, the method comprising:

a step of acquiring orientation information about orientation of the viewer;

a step of extracting an overlapping region in which relative positions from points intersecting with optical axes of lenses disposed in front of respective eyes of the viewer are equal, for the right eye display image and the left eye display image to be presented to the viewer;

a step of deriving a ray direction to be displayed at each pixel position for the right eye display image and the left eye display image based on the orientation information acquired by the step of acquiring; and a step of generating the right eye display image and the left eye display image from a predetermined reference image in which color for each ray direction is stored, based on the ray direction for each pixel position derived by the step of deriving, wherein the step of deriving performs calculations to derive the ray direction to be displayed at each pixel position according to the overlapping region, wherein a number of the calculations is less than a sum of a number of the pixels of the right eye display image and a number of the pixels of the left eye display image.

9. A non-transitory computer-readable storage medium storing instructions that, when executed by a computer, causes the computer to perform a method comprising:

a step of acquiring orientation information about orientation of the viewer;

a step of extracting an overlapping region in which relative positions from points intersecting with optical axes of lenses disposed in front of respective eyes of the viewer are equal, for the right eye display image and the left eye display image to be presented to the viewer;

a step of deriving a ray direction to be displayed at each pixel position for the right eye display image and the left eye display image based on the orientation information acquired by the step of acquiring; and a step of generating the right eye display image and the left eye display image from a predetermined reference image in which color for each ray direction is stored, based on the ray direction for each pixel position derived by the step of deriving, wherein the step of deriving performs calculations to derive the ray direction to be displayed at each pixel position according to the overlapping region, wherein a number of the calculations is less than a sum of a number of the pixels of the right eye display image and a number of the pixels of the left eye display image.

* * * * *